United States Patent
Ranade et al.

(10) Patent No.: US 7,032,089 B1
(45) Date of Patent: Apr. 18, 2006

(54) REPLICA SYNCHRONIZATION USING COPY-ON-READ TECHNIQUE

(75) Inventors: Dilip M. Ranade, Pune (IN); Radha Shelat, Pune (IN)

(73) Assignee: Veritas Operating Corporation, Mountain View, CA (US)

( * ) Notice: Subject to any disclaimer, the term of this patent is extended or adjusted under 35 U.S.C. 154(b) by 335 days.

(21) Appl. No.: 10/457,670

(22) Filed: Jun. 9, 2003

(51) Int. Cl.
*G06F 12/00* (2006.01)

(52) U.S. Cl. ................ 711/161; 711/162; 707/204

(58) Field of Classification Search ........ 711/161–162; 707/203–204; 714/1–7
See application file for complete search history.

(56) References Cited

U.S. PATENT DOCUMENTS 5,978,805 A * 11/1999 Carson ................... 707/10
6,473,775 B1 * 10/2002 Kusters et al. ............ 707/200
2004/0205152 A1 * 10/2004 Yasuda et al. ............. 709/217

* cited by examiner

*Primary Examiner*—Nasser Moazzami
(74) *Attorney, Agent, or Firm*—Campbell Stephenson Ascolese LLP; D'Ann Naylor Rifai

(57) ABSTRACT

A method, system, and computer program product are provided to synchronize data maintained in separate storage areas using a copy-on-read technique. The separate storage areas may be distributed across a network, and the replicas of the data may be used for backup and/or disaster recovery purposes. Storage objects containing data and information relevant to managing the data by a particular application are identified, and only those storage objects are read. Data contained in the storage objects read are then copied to the replica storage area. This process avoids reading non-useful data, making the synchronization more efficient and conserving bandwidth of connections over which the data are sent.

24 Claims, 5 Drawing Sheets

Copy on Write Replication

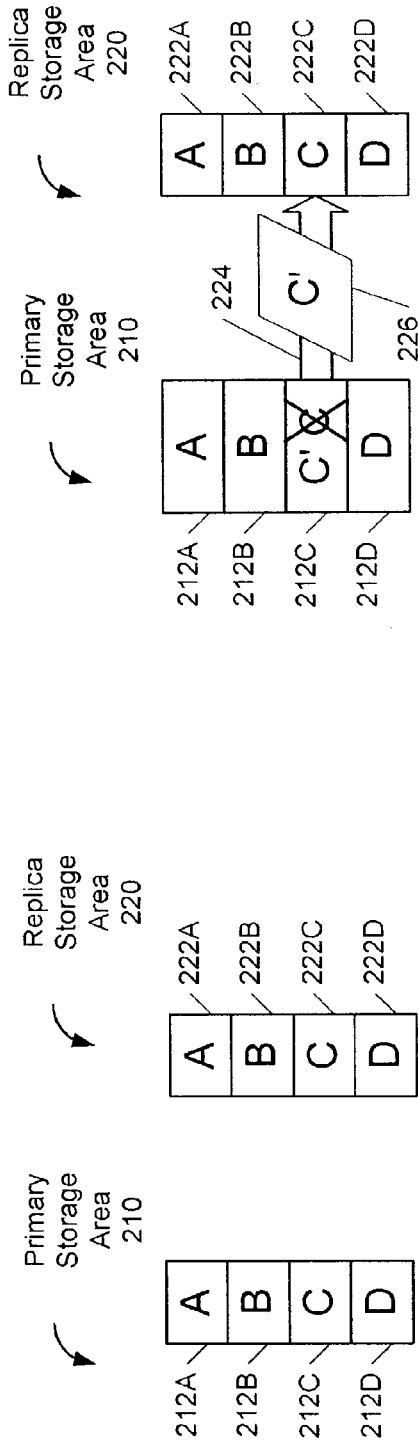
FIG. 2A
Synchronized
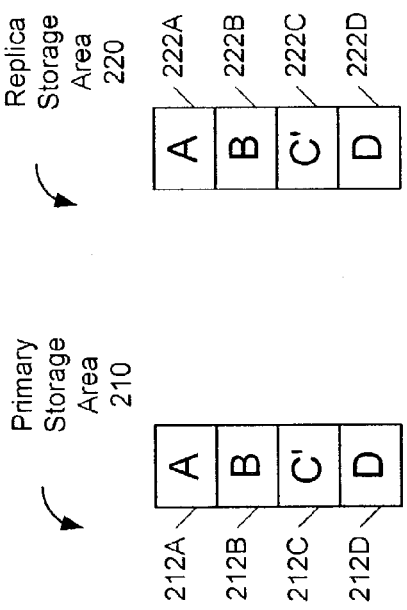
FIG. 2B
Copy On Write Operation
FIG. 2C
Write Data To Replica

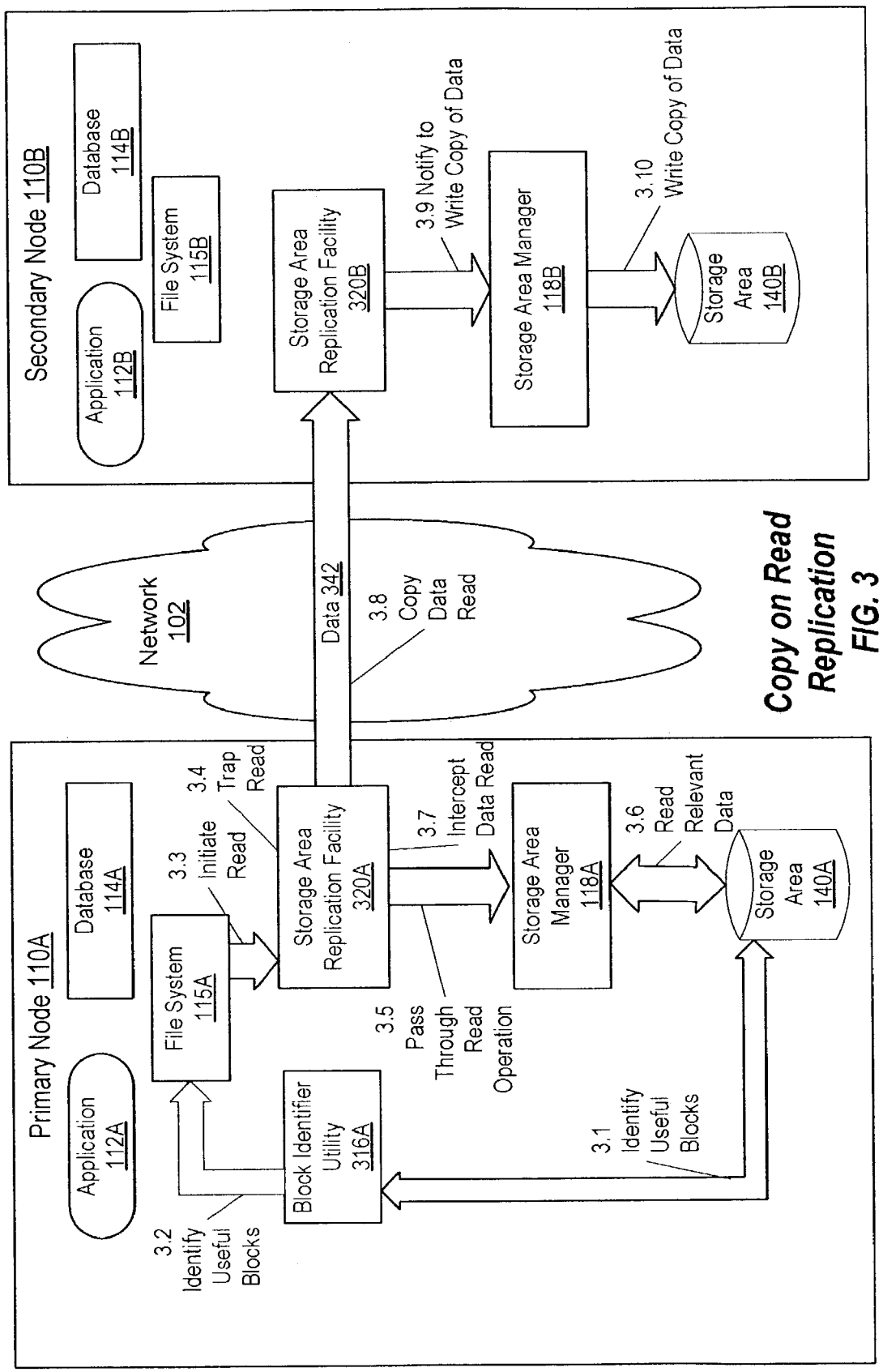

Copy on Read

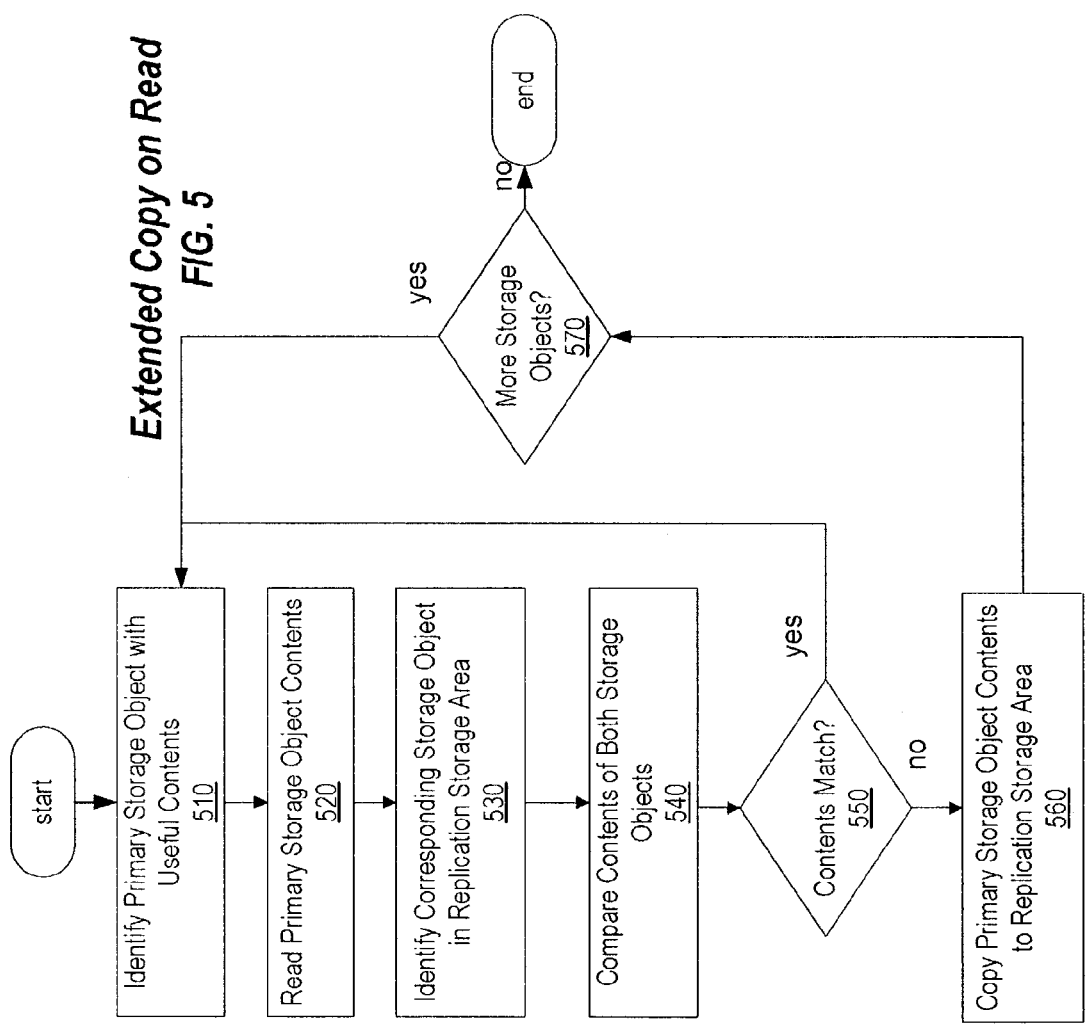

REPLICA SYNCHRONIZATION USING COPY-ON-READ TECHNIQUE

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to replicating data for backup and disaster recovery purposes and, in particular, to synchronizing replicas of data stored in different storage areas.

2. Description of the Related Art

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One strategy includes replicating data from local computer systems to backup local computer systems and/or to computer systems at remote sites. Because disk storage volumes are common types of storage areas that are replicated, the term "storage area" is used interchangeably with "storage volume;" however, one of skill in the art will recognize that the replication processes described herein are also applicable to other types of storage areas and that the use of the term "storage volume" is not intended to be limiting. Furthermore, the unit of storage in a given storage area is referred to herein as a "block," as block terminology is typically used to describe units of storage of storage volumes. Again, one of skill in the art will recognize that the unit of storage can vary according to the type of storage area, and may be specified in units of bytes, ranges of bytes, files, or other types of storage objects. The use of the term "block" herein is not intended to be limiting and is used herein to refer generally to any type of storage object.

Some types of storage areas, such as a storage volume, store data as a set of blocks. Each block is typically of a fixed size; a block size of 512 bytes is commonly used. Thus, a volume of 1000 Megabyte capacity contains 2,048,000 blocks of 512 bytes each. Any of these blocks can be read from or written to by specifying the block number (also called the block address). Typically, a block must be read or written as a whole.

Storage area replication is used to maintain online duplicate copies of some storage areas, such as disk volumes. The original storage area is called the primary, and the duplicate is called the replica. Replication tries to ensure that the secondary volume contains the same data, block by block, as in the primary volume, while the primary volume is in active use.

In case of failure of a server maintaining the primary storage area, applications using the primary storage area can be moved to a replica server under control of external fail over software; this process is also referred to as a "failover." The replica server and primary server may communicate over a network channel.

To accommodate the variety of business needs, some replication facilities provide remote mirroring of data and replicating data over a wide area or distributed network such as the Internet. However, different types of storage typically require different replication methods. Replication facilities are available for a variety of storage solutions, such as database replication products and file system replication products, although typically a different replication facility is required for each type of storage solution. Other replication facilities are available for replicating all contents of a particular type of storage device.

Replication facilities provide such functionality as enabling a primary and secondary node to reverse roles when both are functioning properly. Reversing roles involves such replication operations as stopping the application controlling the replicated data, demoting the primary node to a secondary node, promoting the original secondary node to a primary node, and re-starting the application at the new primary node. Another example of functionality of a replication facility involves determining when a primary node is down, promoting the secondary node to a primary node, enabling transaction logging and starting the application that controls the replicated data on the new primary node. In addition, when the former primary node recovers from failure, the replication facility can prevent the application from starting at the former primary node since the application is already running at the newly-promoted node, the former secondary node. The transaction log can be used to synchronize data at the former and new primary nodes.

Replication of data can be performed synchronously or asynchronously. With synchronous replication, an update is posted to the secondary node and acknowledged to the primary node before completing the update at the primary node. In the event of a disaster at the primary node, data can be recovered from the secondary node without any loss of data because the copies of the data at the primary and secondary nodes contain the same data. With asynchronous replication, updates to data are immediately reflected at the primary node and are queued to be forwarded to each secondary node. Data at the secondary node differs from data at the primary node during the period of time in which a change to the data is being transferred from the primary node to the secondary node, as explained in further detail below. The magnitude of the difference can increase with the transfer time, for example, as update activity increases in intensity. A decision regarding whether to replicate data synchronously or asynchronously depends upon the nature of the application program using the data as well as numerous other factors, such as available bandwidth, network round-trip time, the number of participating servers, and the amount of data to be replicated.

Under normal circumstances, updates, also referred to herein as writes, are sent to the secondary node in the order in which they are generated at the primary node. Consequently, the secondary node represents a state of the primary node at a given point in time. If the secondary node takes over due to a disaster, the data storage areas will be consistent.

A replica that faithfully mirrors the primary currently is said to be synchronized or "in sync;" otherwise, the replica is said to be unsynchronized, or "out of sync." An out of sync replica may be synchronized by selectively or completely copying certain blocks from the primary; this process is called synchronization or resynchronization.

Whether synchronous or asynchronous replication is used, volume replication software can begin to work only after an initial set-up phase where the replica is synchronized with the primary volume. This process is called initial replica synchronization. A volume replication facility is set up to prepare a replica of a primary storage volume. Another storage volume, of the same capacity as the primary storage volume, is configured on a separate server. Data are copied from the primary storage volume to the replica storage volume via a communication network between the primary and replication server. Initial synchronization of two storage areas can be a time consuming process, especially for large volumes or slow networks. The following methods of initial replica synchronization are known:

In offline synchronization, a disk-level backup is performed; the backup storage media, such as tape or CD, are manually taken to a replica server or transferred over a network to the replica server using a file transfer protocol or other similar protocol; and data are restored to a storage volume for the replica.

In bulk synchronization, the entire storage area is copied block by block over a network to a replication site using replication software.

After initial replica synchronization, a subsequent write operation being performed on the primary volume is trapped by the replication facility. A copy of the data being written is sent over the network to be written to the replica volume. This process keeps the primary and the replica volume synchronized as closely as possible. However, problems such as network connectivity failure or host failure may cause the replica volume to become unsynchronized. In such a case, the primary volume and replica volume must be resynchronized.

In one resynchronization process known as "smart synchronization," each block of primary storage is read, a checksum is computed from the data, and the checksum is sent across the network to a replica server. The replica server compares the received checksum against a local checksum computed from a replica of the data. If the checksums do not match, only then are data replicated from the primary to the replica server. This technique is similar to what is used by the open-source file replication utility called "rsync."

However, none of the methods described above use information that is available to application programs managing the data being copied that are running in conjunction with the storage area replication software. In fact, not every block of a volume contains useful data. The application that uses the volume (such as a file system or database) generally has free blocks in which contents are irrelevant and usually inaccessible. Such blocks need not be copied during synchronization.

What is needed is a solution that enables initial synchronization as well as resynchronization to be performed with as little effect on performance as possible. The solution should avoid replicating unnecessary information and enable data to be quickly synchronized across a network or locally.

SUMMARY OF THE INVENTION

The present invention includes a method, system, computer program product, and computer system that replicate relevant data for an application program, with minimal effect on performance of the application program and network traffic. Units of data that contain information related to the application data are identified and read. Relevant units of data are copied to a replication storage area using a copy-on-read technique.

BRIEF DESCRIPTION OF THE DRAWINGS

The present invention may be better understood, and its numerous objectives, features and advantages made apparent to those skilled in the art by referencing the accompanying drawings.

FIGS. 2A, 2B and 2C, collectively referred to as FIG. 2, show details of one implementation of a copy-on-write operation.

FIG. 3 shows an example of one implementation of a copy-on-read operation as used for replication in accordance with the present invention.

FIG. 5 is a flowchart showing an enhanced version of the copy-on-read operation described in FIG. 4.

The use of the same reference symbols in different drawings indicates similar or identical items.

DETAILED DESCRIPTION

Figure 1:
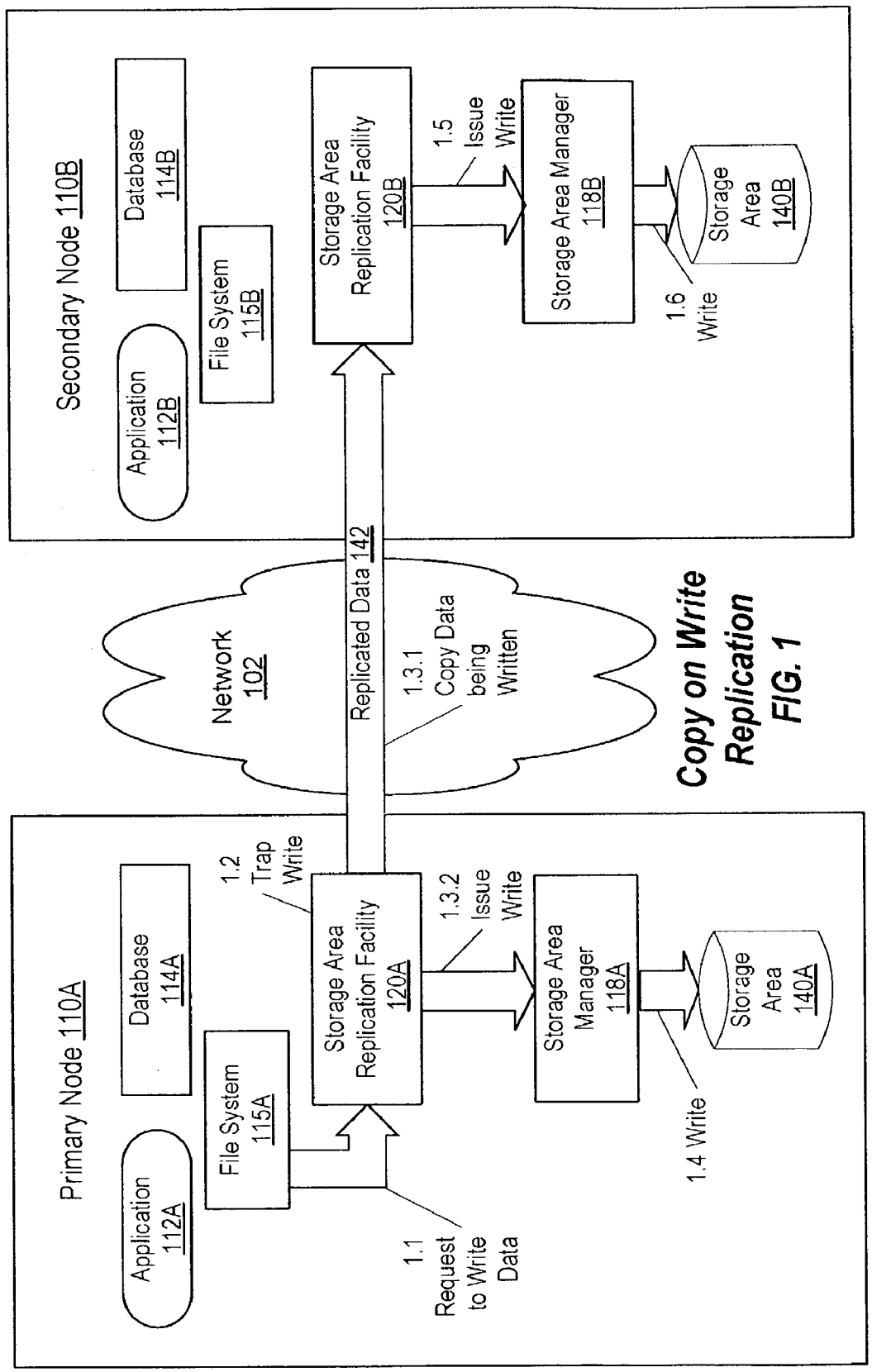
FIG. 1 is a block diagram of a system for replicating data from a primary to a secondary node using a copy-on-write operation.

For a thorough understanding of the subject invention, refer to the following Detailed Description, including the appended claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention includes a method, system, computer program product, and computer system that synchronize data maintained in separate storage areas using a copy-on-read technique. The separate storage areas may be distributed across a network, and the replicas of the data may be used for backup and/or disaster recovery purposes. Storage objects containing data and information relevant to managing the data by a particular application are identified, read, and copied to a secondary storage area. This process avoids reading non-useful data, making the synchronization more efficient and conserving bandwidth of connections over which the data are sent.

In the environment described above, data from a primary node are replicated to maintain a consistent copy of data at a secondary node. Typically, a secondary node is remote from the physical location of the primary node and can be accessed via a network, although it is not a requirement that the secondary node be physically remote. Each of the primary and secondary nodes may be part of a cluster in which multiple computer systems are configured to serve either as an active node or a backup node for the cluster.

A given node can serve as a primary node for one application program, and a secondary node for another application program. Furthermore, for the same application program, a given node can serve as a secondary node at one point in time, and later as a primary node to "cascade" replication of the data to other nodes connected via communication links. For example, a first replication may be made between network nodes in different cities or states, and a node in one of the cities or states can serve as the primary node for replicating the data worldwide.

Each replication primary node can have more than one replication secondary node. As used herein, a reference to the secondary node implicitly refers to all secondary nodes associated with a given primary node because, typically, the same replication operations are performed on all secondary nodes.

Replication facilities provide such functionality as enabling primary and secondary nodes to reverse roles when both are functioning properly. Reversing roles involves replication operations such as stopping the application controlling the replicated data, demoting the primary node to a secondary node, promoting the original secondary node to a primary node, and re-starting the application at the new primary node. Another example of functionality of a replication facility is called fail over, which involves determining when a primary node is down, promoting the secondary node to a primary node, enabling transaction logging, and starting the application controlling the replicated data on the new primary node (sometimes referred to as a "fail back").

In addition, when the former primary node recovers from failure, the replication facility can prevent the application from starting at the former primary node, since the application is already running at the secondary node. An administrator may use the transaction log to synchronize data at the former and new primary nodes.

Replication is unidirectional for a given set of data. Writes of data on the primary node are sent to the secondary nodes, but access to the data at the secondary nodes is typically read-only. If read/write access to a secondary set of data is required (after a primary node crash, for example), replication can be halted for that set of data. If data are then written to storage areas on secondary nodes, a synchronization process can be performed when the primary node becomes available again so that both sets of data are again identical before resuming replication of data.

Application data should not be allowed to enter a state in which the failure of the network or the primary node would leave that application data in an inconsistent and unusable state. During normal operation, data loss can be prevented by logging all writes and ensuring that writes to the log are complete before attempting any writes to the primary and secondary data storage areas.

Data consistency is ensured by coordinating operations such that they occur in the same order on each secondary node as on the primary node. Consequently, data storage modifications occur in the same order on both the secondary and the primary node. If a primary or secondary node crashes, recovery includes locating the last entry that had not yet been acknowledged by the secondary node as having been successfully written, before the crash. Operation can continue from that point. However, a set of requests may exist between the last acknowledged request and the last request that was sent to the replication storage area before the crash. The data changed in this set of requests may or may not have been written to the secondary node data storage areas.

If the primary node crashes, some update and any log information on the primary node is lost, and generally the secondary node takes over as a primary node with data as it existed at an earlier point in time. However, if the primary node does not crash, but is unable to communicate with the secondary node due to failure of the network and/or of the secondary node, the primary node continues to log updates. In some situations, the primary node may also lock the addresses of all blocks or storage objects from which an acknowledgement was not received from the secondary node. Now the replica is out of sync, and the replica must be resynchronized using the logged data before normal copy-on-write replication can resume. If addresses of blocks or storage objects that were not acknowledged are not logged, a full synchronization must be performed.

FIG. 1 shows a detailed view of a configuration for replication management using a copy-on-write operation. Primary node 110A and secondary node 110B are considered to be computer systems as are known in the art, including a processor (not shown) for executing instructions and a memory (not shown) for storing the instructions. Primary node 110A includes an application program 112A, a database 114A, and a file system 115A. Storage area manager 118A and storage area replication facility 120A can obtain data from at least one of application program 112A, database 114A, and file system 115A. Replication facility 120A stores the data in storage area 140A. It is within the scope of the invention that storage area 140A can include multiple storage objects, such as individual blocks making up a storage volume disk.

Secondary node 110B can include corresponding copies of application 112A, database 114A, and file system 115A, respectively labeled application 112B, database 114B, and file system 115B in FIG. 1. These respective copies can perform the functions of primary node 110A in the event of disaster, although none of these programs must be executing for performing replication in accordance with the present invention. Alternatively, programs and other files associated with the application, database and file system may be stored in a data storage area on the primary node and replicated along with the data. Should the secondary node itself need to manage the data, the programs and other files can be extracted from the replicated data and executed at the secondary node.

Corresponding copies of storage area manager 118A and replication facility 120A also reside on secondary node 110B, respectively, storage area manager 118B and storage area replication facility 120B. These copies enable secondary node 110B to perform functions similar to those performed at primary node 110A and to manage storage areas and replicate data to other secondary nodes if necessary.

In action 1.1, file system 115A requests storage area manager 118A to write data. Note that one or more of application 112A, database 114A, or file system 115A can request storage area manager 118A to write data to storage area 140A. However, in action 1.2, storage area replication facility 120A intercepts, or traps, the write command on its way to storage area manager 118A. In actions 1.3.1 and 1.3.2, storage area replication facility 120A begins two simultaneous actions; no ordering is implied by the numbering of these two actions, such that action 1.3.2 can begin prior to beginning action 1.3.1, or vice versa. In action 1.3.1., storage area replication facility 120A copies the data to be written by storage area manager 118A, referred to as replicated data 142, to storage area replication facility 120B on secondary node 110B. Simultaneously, in action 1.3.2, storage area replication facility 120A passes the write command to storage area manager 118A. In action 1.4, storage area replication manager 118A writes the data to storage area 140A.

Storage area replication facility 120A initiates a transfer of data from storage area 140A to storage area 140B, as shown by the arrow indicating transfer of replicated data 142 from storage area replication facility 120A to storage area replication facility 120B. Data transfer is typically performed over a communication link, such as network 102, between the primary and secondary nodes. Upon receiving replicated data 142, in action 1.5, storage area replication facility 120B on node 110B issues a write command to storage area manager 118B. In action 1.6, storage area manager 118B writes the data to storage area 140B.

FIGS. 2A, 2B and 2C, collectively referred to as FIG. 2, show details of a copy-on-write operation. This particular example is given to illustrate the activities performed in one implementation of a copy-on-write operation; other implementations of copy-on-write operations are also within the scope of the invention. In FIG. 2A, each storage object, referred to herein as a block, of a primary storage area 210 is represented by one of blocks 212A, 212B, 212C, or 212D. FIG. 2A also shows a replica storage area 220, with each block 222A through 222D being a replica of one of blocks 212A through 212D in primary file set 210. In FIG. 2A, secondary storage area 220 represents the state of the data at the time initial synchronization with primary storage area 210 is performed, when the contents of the primary and secondary storage areas 210 and 220 are identical. Note that, while a storage block typically contains 512 bytes of data, the contents of each block are represented by a single character.

In FIG. 2B, block 212C of primary storage area 210 is updated with a value of "C'", having originally contained a value of "C." The previous value of "C" is crossed out for explanatory purposes. When the write operation is performed, the data having a value of "C'", shown in data block 226, are copied from primary storage area 210 to replica storage area 220, as shown by arrow 224. This technique is called the copy-on-write technique. Note that during the period of time in which data are being transferred from primary storage area 210 to replica storage area 220, the data of blocks 212C and 222C are briefly not synchronized.

FIG. 2C shows primary storage area 210 and replica storage area 220 after the data of data block 226 have arrived and are written to replica storage area 220. Note that both blocks 212C and 222C now contain data having a value of "C'". In practice, primary storage area 210 receives a stream of updates to various blocks, which may include multiple updates to the same block. The updates are applied to the replica storage area 220 in the same order as they are applied to primary storage area 210, so that replica storage area 220 contains an accurate image of the primary at some point in time.

Creation of a secondary storage area such as replica storage area 220 ceases write activity to the primary storage area 210, initializes the replica storage area 220 by, for example, copying data to all data blocks using one of the three techniques for initial replica synchronization described above, and restarts input/output of applications using the data. Specifically, the applications using the data are first brought to a stable state where all of the data used by the application(s) are written to disk. To achieve this stable state, input/output operations are momentarily blocked to primary storage area 210. Replica storage area 220 is then created by copying data from primary storage 210. Input/output operations to primary storage area 210 are restarted. Such techniques can be used for various types of applications, databases, and file systems. Not all of the data in each block is necessarily relevant for operation of the application managing the data on a remote node. FIG. 3 introduces a system designed to avoid the problem of copying non-useful blocks.

FIG. 3 shows a copy-on-read operation as used for replicating data in accordance with the present invention. The copy-on-read replication is performed in the same environment as described previously with reference to FIG. 1, with a few minor changes. Primary node 110A now includes a block identifier utility 316A that is used to identify useful blocks (storage objects) of storage area 140A. Block identifier utility 316A is representative of an identifier module, means, or instructions for identifying relevant, useful blocks to a module reading the data.

In the embodiment shown, application 112A, database 114A, and/or file system 115A can read the data (in conjunction with storage area manager 118A), either directly or via one of the other components. For example, application 112A may use both file system 115A and storage area manager 118A to read the data. Therefore, application 112A, database 114A, file system 115A and/or storage area manager 118A can also be considered to form a reading module, means, or instructions. In the example shown in FIG. 3, block identifier utility 316A identifies the relevant blocks to file system 115A, which is representative of a reading module, means, or instructions. In an alternative embodiment, block identifier utility 316A may identify relevant blocks to storage replication facility 320A.

Storage area replication facilities 320A and 320B are similar to storage area replication facilities 120A and 120B, with the exception that storage area replication facility 320A is capable of operating in a "copy-on-read" mode. In another embodiment, storage area replication facility 320B may also be capable of operating in a "copy-on-read" mode, but the present invention does not require that both storage area replication facilities can perform a copy-on-read operation. Either or both of storage area replication facility 320A and 320B are representative of a copying module, means or instructions used to replicate data to a secondary node. Implementation issues for block identifier utility 316A and storage area replication facilities 320A and 320B are further discussed below and in the "Implementation Issues" section of this document.

Normally, replication facilities that operate in a "copy-on-write" mode, such as replication facilities 120A and 120B of FIG. 1, perform write operations on a replicated storage area only for write requests to the primary storage area. In the "copy on read" mode of the present invention, storage area replication facilities 320A and 320B write data from blocks that are read from the primary storage area 140A to secondary storage area 140B, in addition to having "copy-on-write" capabilities that need not be disabled while the storage area replication facility is in copy-on-read mode.

Block identifier utility 316A on primary node 110A ensures that only data containing useful, relevant data are read to ensure efficiency of the copy-on-read operation.

For purposes of FIG. 3, assume that each of storage area replication facilities 320A and 320B is currently operating in "copy-on-read" mode. Block identifier utility 316A can be implemented either within an "replication-aware" application enhanced to read all relevant blocks necessary for operation of the application, such as an enhanced version of application 112A, database 114A, or file system 115. Alternatively, block identifier utility 316A can be implemented as an application-level utility that systematically reads all the relevant blocks, and only the relevant blocks, of the primary storage area 140A. For example, if the application reading the data is a file system, a "file dump" utility may exist that reads all relevant file data and provides the contents of those blocks directly to storage area replication facility 120A. As another example, if the primary storage area is used for storage by a replication-aware database, and it is known which tables are kept on this storage area, a query to read those tables generates read operations to read all the relevant storage objects in the storage area, including storage objects containing database metadata.

In action 3.1, block identifier utility 316A identifies useful blocks stored in storage area 140A. While block identifier utility 316A is shown as directly accessing storage area 140A to perform this identification, one of skill in the art will understand that several intermediate steps may be performed to provide this functionality. For example, typically a program reading a data block will call an interface to a storage area manager, such as storage area manager 118A, which deals with directly accessing the physical device. Intermediate layers, such as storage area replication facility 320A or one of application 112A, database 114A, or file system 115A, may also be used to read the particular type of data being stored on the physical device.

The identification of useful blocks is typically performed in response to a user command. A user command may be issued by a person or by an application providing a user interface. For example, a user interface may be provided to block identifier utility 316A and/or storage area replication facility 320A. A user command may start the resynchronization process, without necessarily requiring the user to be aware of the underlying implementation details.

In action 3.2, block identifier utility 316A notifies file system 115A of the useful blocks. In action 3.3, file system 115A initiates a read operation on the relevant blocks. However, in action 3.4, storage area replication facility 320A intercepts, or traps, the read operation because storage area replication facility 320A is operating in "copy on read" mode. In action 3.5, storage area replication facility 320A allows the read operation to pass through to storage area manager 118A. In action 3.6, storage area manager 18A reads the data from the identified relevant blocks from storage area 140A.

In action 3.7, the data read (data 342) are intercepted by storage area replication facility 320A. In action 3.8, storage area replication facility 320A provides data 342 to storage area replication facility 320B on secondary node 110B. In action 3.9, storage area replication facility 320B on secondary node 110B notifies storage area manager 118B on secondary node 110B to write the copy of the data read to storage area 140B on secondary node 110B. In action 3.10, storage area manager 118B writes the copy of the data read to storage area 140B on secondary node 110B. Once all the relevant blocks have been read and replicated, storage area replication facilities 320A and 320B can disable "copy-on-read" mode. For example, copy-on-read mode may be disabled by issuing a user command via a command line utility or via a user interface provided by the block identifier utility 316A or storage replication facility 320A.

The example of FIG. 3 can be modified such that either application 112A or database 114A can be substituted for file system 115A. In addition, the example can be modified so that a series of operations takes place between application 112A, database 114A, and/or file system 115A before actually initiating the read operation. Furthermore, block identifier utility 316A may be capable of directly interpreting or identifying the relevant blocks without making use of application 112A, database 114A, or file system 115A. All such data flows are within the scope of the invention.

Figure 4:
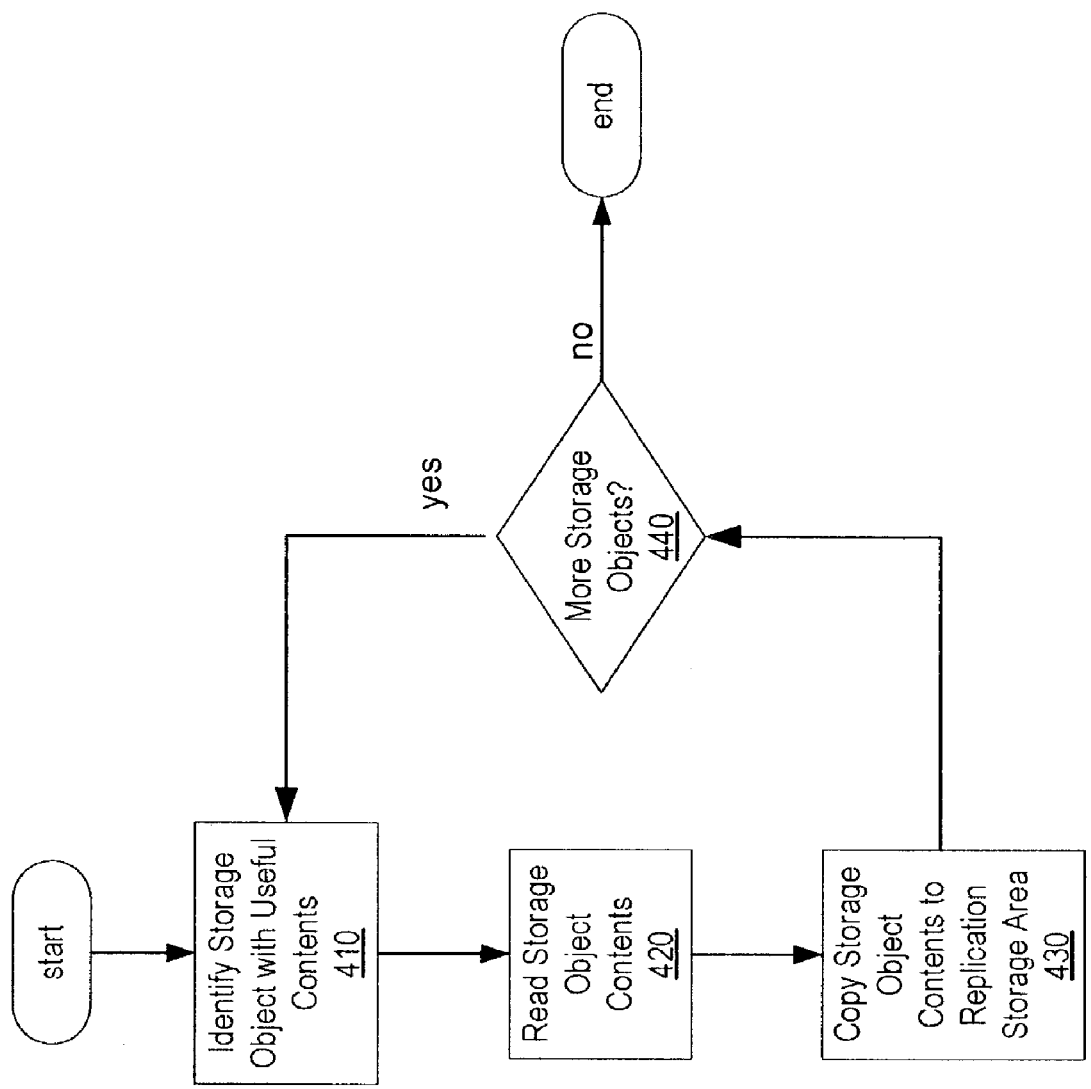
FIG. 4 is a flowchart of the copy-on-read operation described in FIG. 3.

FIG. 4 is a flowchart of a copy-on-read operation in accordance with the invention. In "Identify Storage Object with Useful Contents" step 410, an application or utility capable of identifying storage objects of data or information used for managing the data identifies a useful storage object. Control proceeds to "Read Storage Object Contents" step 420, where the contents of the storage object identified are read. Control then proceeds to "Copy Storage Object Contents to Replication Storage Area" step 430 in a copy-on-read operation. Control then proceeds to "More Storage Objects?" decision point 440, where a determination is made whether all storage objects have been considered. If additional storage objects remain, control returns to "Identify Storage Object with Useful Contents" step 410 to process another storage object. If no additional storage objects remain, the copy-on-read operation is complete.

FIG. 5 is a flowchart of an extended copy-on-read operation in accordance with one embodiment of the invention. The "copy on read" mode solution can be combined with the smart synchronization method described above to further conserve network bandwidth. This enhancement is especially beneficial in situations where a replica that is mostly up-to-date has become unsynchronized due to a temporary failure and needs to be resynchronized with the primary storage area. Assume again that replication facilities performing the steps of FIG. 5 are already operating in "copy-on-read" mode.

In "Identify Primary Storage Object with Useful Contents" step 510, an application or utility capable of identifying storage objects with data or information used for managing the data identifies a storage object with useful contents. Control proceeds to "Read Primary Storage Object Contents" step 520, where the contents of the block identified are read. Control then proceeds to "Identify Corresponding Storage Object in Replication Storage Area" step 530, where a set of corresponding storage objects in secondary storage (the replication storage area) are identified. In "Compare Contents for Both Blocks" step 540, the contents of the two storage areas are compared. In one embodiment, both blocks are read and checksums computed from the corresponding blocks in the primary storage area and the replication storage area are compared. Other techniques for comparing the contents of the primary and secondary storage objects are within the scope of the invention. Control then proceeds to "Contents Match?" decision point 550. If the contents of the corresponding blocks match (as determined by matching checksums in the above-described example), no need exists to copy the data. Control returns to "Identify Primary Storage Object with Useful Contents" step 510 to search for another storage object having useful contents.

If at "Contents Match?" decision point 550, the contents of the corresponding blocks do not match, the data must be copied from the primary storage object to the secondary storage object. Control then proceeds to "Copy Primary Storage Object Contents to Replication Storage Area" step 560 to copy the data to the replication storage area in a copy-on-read operation. Control then proceeds to "More Storage Objects?" decision point 570, where a determination is made whether additional storage objects remain for analysis. If additional storage objects remain, control returns to "Identify Primary Storage Object with Useful Contents" step 510 to search for another storage object having useful contents. If no additional storage objects remain, synchronization of the primary and secondary storage areas is complete.

Implementation Issues

In some "copy-on-write" environments, storage area replication facilities work as a layered driver interposed between an application and a device driver for the storage area, such as a disk storage volume. The layered driver traps all write requests, but acts as a "pass through" for read requests. In the present invention, read requests are also trapped, and once the data are read into memory, the data are copied to the replication storage area. The infrastructure for copying data to a replication storage area is already in place for write operations. Therefore, some storage replication facilities can be modified to operate in "copy on read" mode by changing a driver for the storage area replication facility.

Establishing a "copy-on-read" mode in the storage area replication facility is the first step; however, a utility must be used that will identify relevant data blocks. For example, some file systems include utilities that walk through all the on-disk data structures, but most of them will not necessarily read every useful data block of a file. Some file systems include a "dump" utility that traverses all the data structures as well as the data blocks, so such utilities can be good candidates for identifying relevant blocks.

Unfortunately, file systems sometimes duplicate several data structures for increased reliability, and the file system's corresponding dump utility does not read blocks containing the duplicates. However, so that the data can be used correctly, such file system duplicate blocks must be copied in addition to the data. Examples of such duplicate structures include extra copies of a super block containing metadata about the particular storage area of interest; a duplicate object location table containing a list of special files that should be copied; and duplicates of certain special files used for file system operation.

In addition, another type of information not typically copied by a file system dump utility is a journal log of changes made to the files in the file system. However, it is possible to empty the log before starting replication by performing a clean unmount of the file system or performing a log replay using other utilities. Thus, some dump utilities may be capable of being modified to be used in conjunction with a "copy on read" mode to perform synchronization of a storage area used by a file system.

Advantages of the present invention are many. Network bandwidth is conserved by copying only relevant data, and replicas of primary data can be initially synchronized and resynchronized more efficiently than by using known techniques. Having reliable replicas of primary data enables recovery from network or node failure to be performed more quickly, thereby providing consistently available data.

OTHER EMBODIMENTS

The "copy on read" technique can also be applied to file system replication products that trap file system access calls. In addition, the "copy on read" technique can be applied to file system-level replication products, distributed storage products, and distributed file system products, where a recursive read-only scan of a certain portion of the name space and associated data objects can be replicated.

One of skill in the art will recognize that the separation of functionality into an identifying module, a reading module, and a copying module is but one example of an implementation of the present invention. Other configurations to perform the same functionality are within the scope of the invention.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
  selecting a first storage object of a first storage area;
  determining whether the first storage object contains relevant data;
  if the first storage object contains relevant data, performing the following:
    reading the first storage object; and
    when the reading is completed, copying contents of the first storage object to a second storage object of a second storage area; and
  if the first storage object does not contain relevant data, selecting a second storage object of the first storage area without reading the first storage object and without copying the contents of the first storage object to the second storage object.

2. The method of claim 1 wherein
  the copying the contents of the first storage object to the second storage object comprises sending the contents over a network connection from the first storage area to the second storage area.

3. The method of claim 1 wherein
  the determining whether the first storage object contains relevant data is performed by a program managing the data.

4. The method of claim 1 wherein
  the copying the contents is performed by a program replicating the data from the first storage area to the second storage area.

5. The method of claim 1 wherein
  the determining whether the first storage object contains relevant data is performed by a second program external to a first program managing the data.

6. The method of claim 1 further comprising:
  when the contents of the first storage object change such that the first storage object contains second contents and the second contents are relevant data, copying the second contents to the second storage area.

7. A method comprising:
  selecting a first storage object of a first storage area;
  determining whether the first storage object contains relevant data;
  if the first storage object contains relevant data, performing the following:
    identifying a second storage object of a second storage area corresponding to the first storage object of the first storage area, wherein
      contents of the second storage object were previously copied from contents of the first storage object;
    comparing the contents of the first storage object to the contents of the second storage object; and
    when the contents of the first storage object and the contents of the second storage object do not match, copying the contents of the first storage object to the second storage object; and
  if the first storage object does not contain relevant data, selecting a second storage object of the first storage area without reading the first storage object and without copying the contents of the first storage object to the second storage object.

8. The method of claim 7 wherein
  the comparing comprises:
    comparing a first checksum computed from the contents of the first storage object with a second checksum computed from the contents of the second storage object; and
    determining that the contents of the first storage object do not match the contents of the second storage object when the first and second checksums do not match.

9. A system comprising:
  selecting means for selecting a first storage object of a first storage area;
  determining means for determining whether the first storage object contains relevant data;
  reading means for reading the first storage object if the first storage object contains relevant data; and
  copying means for copying contents of the first storage object to a second storage object of a second storage area if the first storage object contains relevant data;
  selecting means for selecting a second storage object of the first storage area without reading the first storage object and without copying the contents of the first storage object to the second storage object if the first storage object does not contain relevant data.

10. The system of claim 9 wherein
  the copying means are configured to be placed into a copy-on-read mode prior to the reading means reading the first storage object.

11. The system of claim 9 further comprising:
  sending means for sending the contents over a network connection from the first storage area to the second storage area.

12. The system of claim 9 further comprising:
  second copying means for copying second contents of the first storage object to the second storage object if the second contents are relevant data.

13. A system comprising:
  a selecting module configured to select a first storage object of a first storage area;
  a determining module configured to determine whether the first storage object contains relevant data;
  a reading module configured to read the first storage object if the first storage object contains relevant data;
  a copying module configured to copy contents of the first storage object to a second storage object of a second storage area when the reading is completed if the first storage object contains relevant data; and
  a selecting module to select a second storage object of the first storage area without reading the first storage object and without copying the contents of the first storage object to the second storage object if the first storage object does not contain relevant data.

14. The system of claim 13 wherein
the copying module is configured to be placed into a copy-on-read mode prior to the reading module reading the first storage object.

15. The system of claim 13 further comprising:
a sending module configured to send the contents over a network connection from the first storage area to the second storage area.

16. The system of claim 13 wherein
the copying module is further configured to copy second contents of the first storage object to the second storage object if the second contents are relevant data.

17. A computer system comprising:
a processor for executing instructions; and
a memory for storing the instructions, wherein the instructions comprise:
   selecting instructions configured to select a first storage object of a first storage area;
   determining instructions configured to determine whether the first storage object contains relevant data;
   reading instructions configured to read the first storage object if the first storage object contains relevant data; and
   copying instructions configured to copy contents of the first storage object to a second storage object of a second storage area when the reading is completed if the first storage object contains relevant data; and
   selecting instructions configured to select a second storage object of the first storage area without reading the first storage object and without copying the contents of the first storage object to the second storage object if the first storage object does not contain relevant data.

18. The computer system of claim 17 wherein
the copying instructions are configured to be placed into a copy-on-read mode prior to the reading instructions reading the first storage object.

19. The computer system of claim 17 further comprising:
sending instructions configured to send the contents over a network connection from the first storage area to the second storage area.

20. The computer system of claim 17 wherein
the copying instructions are further configured to copy second contents of the first storage object to the second storage object if the second contents are relevant data.

21. A computer-readable medium comprising:
selecting instructions configured to select a first storage object of a first storage area;
determining instructions configured to determine whether the first storage object contains relevant data;
reading instructions configured to read the first storage object if the first storage object contains relevant data;
copying instructions to copy contents of the first storage object to a second storage object of a second storage area when the reading is completed if the first storage object contains relevant data; and
selecting instructions configured to select a second storage object of the first storage area without reading the first storage object and without copying the contents of the first storage object to the second storage object if the first storage object does not contain relevant data.

22. The computer-readable medium of claim 21 wherein
the copying instructions are configured to be placed into a copy-on-read mode prior to the reading module reading the first storage object.

23. The computer-readable medium of claim 21 further comprising:
sending instructions configured to send the contents over a network connection from the first storage area to the second storage area.

24. The computer-readable medium of claim 21 wherein
the copying instructions are further configured to copy second contents of the first storage object to the second storage object if the second contents are relevant data.

* * * * *